United States Patent
Townsend et al.

(10) Patent No.: US 10,920,377 B2
(45) Date of Patent: Feb. 16, 2021

(54) VERTICAL TAKEOFF AND LANDING PAD AND INTERLOCKING PAVERS TO CONSTRUCT SAME

(71) Applicant: Craig Technical Consulting, Inc., Merritt Island, FL (US)

(72) Inventors: Ivan Townsend, Kennedy Space Center, FL (US); Matthew Nugent, Kennedy Space Center, FL (US); Thomas Lippitt, Kennedy Space Center, FL (US); Robert Mueller, Kennedy Space Center, FL (US); Nathan Gelino, Kennedy Space Center, FL (US); Jason Schuler, Kennedy Space Center, FL (US); Jonathan Smith, Kennedy Space Center, FL (US); Andrew Nick, Kennedy Space Center, FL (US)

(73) Assignee: Craig Technical Consulting, Inc., Merritt Island, FL (US)

( * ) Notice: Subject to any disclaimer, the term of this patent is extended or adjusted under 35 U.S.C. 154(b) by 16 days.

(21) Appl. No.: 16/377,856

(22) Filed: Apr. 8, 2019

(65) Prior Publication Data
US 2019/0309485 A1 Oct. 10, 2019

Related U.S. Application Data

(60) Provisional application No. 62/654,833, filed on Apr. 9, 2018.

(51) Int. Cl.
*E01C 5/00* (2006.01)
*E01C 9/00* (2006.01)
*B64F 1/00* (2006.01)

(52) U.S. Cl.
CPC .............. *E01C 9/008* (2013.01); *B64F 1/00* (2013.01); *E01C 5/00* (2013.01); *E01C 5/006* (2013.01); *E01C 2201/12* (2013.01)

(58) Field of Classification Search
CPC .. E01C 9/008; E01C 2201/12; E01C 2201/14; E01C 5/00; E01C 5/04; B64F 1/00
(Continued)

(56) References Cited

U.S. PATENT DOCUMENTS 708,471 A * 9/1902 Flood .................... E04B 1/4178
52/513
719,790 A * 2/1903 Gregory .................... E01C 5/00
404/42
(Continued)

FOREIGN PATENT DOCUMENTS

DE 830806 C * 2/1952 ............... E01C 5/00
DE 1658549 A1 * 2/1970 ............... E02B 3/14
(Continued)

OTHER PUBLICATIONS

Thompson, Mark; "A Star Reborn: Fontainebleau, Miami Beach"; Dec. 27, 2008, MRNY Style & Travel http://www.mrnystyleandtravel.com/?p=3187 (Year: 2008).*
(Continued)

*Primary Examiner* — Thomas B Will
*Assistant Examiner* — Katherine J Chu
(74) *Attorney, Agent, or Firm* — Mark Malek; Kelly G. Swartz; Widerman Malek, PL

(57) ABSTRACT

An interlocking paver system including polygon and spacer pavers. The polygon paver has a longitudinal axis extending from a first to a second side and a transverse axis orthogonal to the longitudinal axis and extending from a third to a fourth side. The spacer paver has a longitudinal axis extending from a first to a second side and a transverse axis orthogonal
(Continued)

to the longitudinal axis and extending from a third to a fourth side. Both the polygon and spacer pavers are symmetrical about the longitudinal and transverse axes. The spacer paver is configured to selectively interlock with the polygon paver with either of the third or fourth side of the polygon paver adjacent either of the first or second side of the spacer paver and either of the first or second side of the polygon paver adjacent either of the third or fourth side of the spacer paver.

1 Claim, 4 Drawing Sheets

(58) Field of Classification Search
USPC .......................................... D25/113; 404/41
See application file for complete search history.

(56) References Cited

U.S. PATENT DOCUMENTS

| | | | | |
|---|---|---|---|---|
| 1,158,051 A | * | 10/1915 | Hopkinson | E04F 15/02 428/44 |
| 1,417,010 A | * | 5/1922 | Wright | E01C 5/00 404/41 |
| 1,430,392 A | * | 9/1922 | Lukens | B28B 1/52 106/164.6 |
| 1,812,711 A | * | 6/1931 | Pessione | E01C 5/00 404/42 |
| 2,942,115 A | * | 6/1960 | O'Connell | G21F 3/04 250/517.1 |
| 2,999,431 A | * | 9/1961 | Mitchell | E01C 13/045 472/92 |
| 3,722,162 A | * | 3/1973 | Ludvigsen | E01C 5/00 52/608 |
| 3,897,164 A | * | 7/1975 | Dodino | E01C 5/00 404/41 |
| 4,128,357 A | * | 12/1978 | Barth | B28B 3/021 404/41 |
| D259,214 S | * | 5/1981 | Landry, Jr. | D25/115 |
| 4,919,565 A | * | 4/1990 | Gopfert | E01C 5/06 404/41 |
| 5,035,532 A | * | 7/1991 | Gargollo | E01C 5/00 404/41 |
| 5,046,887 A | * | 9/1991 | Fontana | E01C 5/00 404/34 |
| 5,108,219 A | * | 4/1992 | Hair | E01C 5/00 404/41 |
| 5,202,166 A | * | 4/1993 | Crompton | A63F 9/001 273/153 R |
| D404,836 S | * | 1/1999 | Barth | D25/113 |
| 5,890,836 A | * | 4/1999 | Leech | E02B 3/14 404/34 |
| 6,079,902 A | * | 6/2000 | Pettee, Jr. | E02B 3/14 404/35 |
| 7,160,052 B2 | * | 1/2007 | Weiss, Jr. | E01C 5/00 404/29 |
| 2003/0208983 A1 | * | 11/2003 | Kendall | E04F 15/08 52/605 |

FOREIGN PATENT DOCUMENTS

| | | | | |
|---|---|---|---|---|
| DE | 2110563 A1 | * | 9/1972 | E01C 5/00 |
| DE | 2526631 A1 | * | 12/1976 | E01C 5/06 |
| FR | 718846 A | * | 1/1932 | E01C 5/00 |
| FR | 1178186 A | * | 5/1959 | E04B 2/08 |
| GB | 1379825 A | * | 1/1975 | E01C 5/00 |

OTHER PUBLICATIONS

Jacob, Wendy; "New Breed of tile elevates patterned floors": Mar. 11, 2016; The Star https://www.thestar.com/life/2016/03/11/new-breed-of-tile-elevates-patterned-floors.html (Year: 2016).*

* cited by examiner

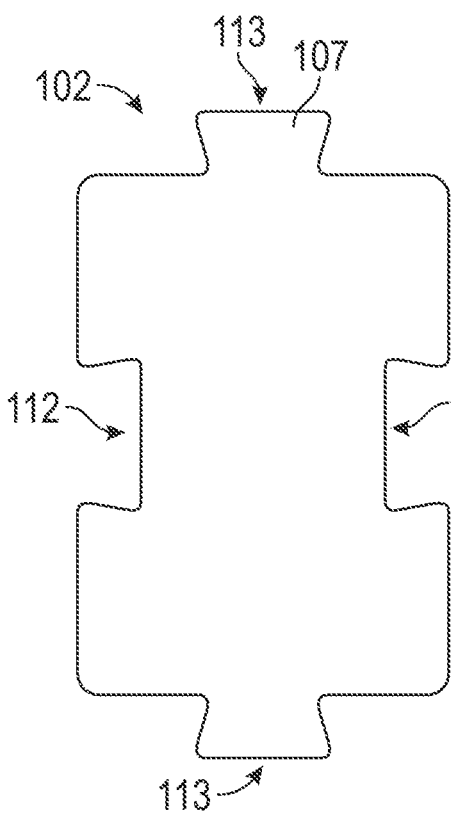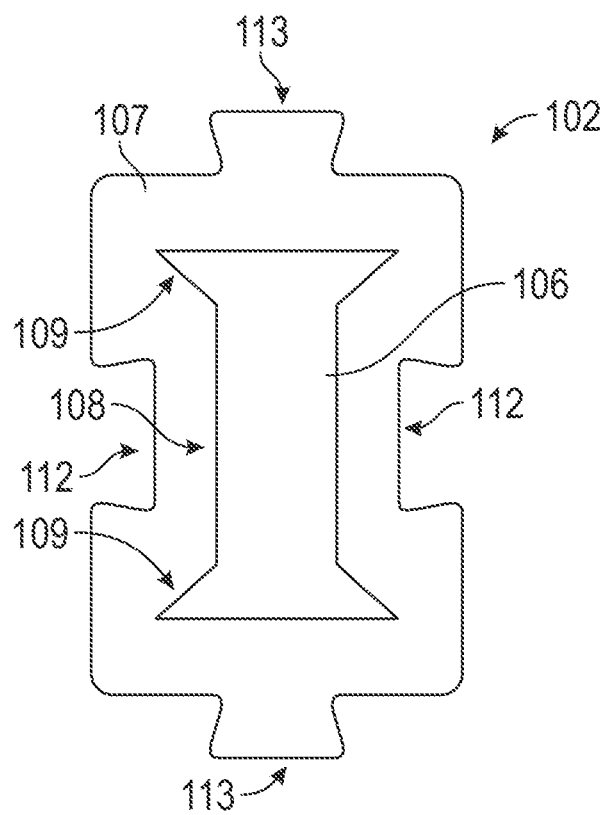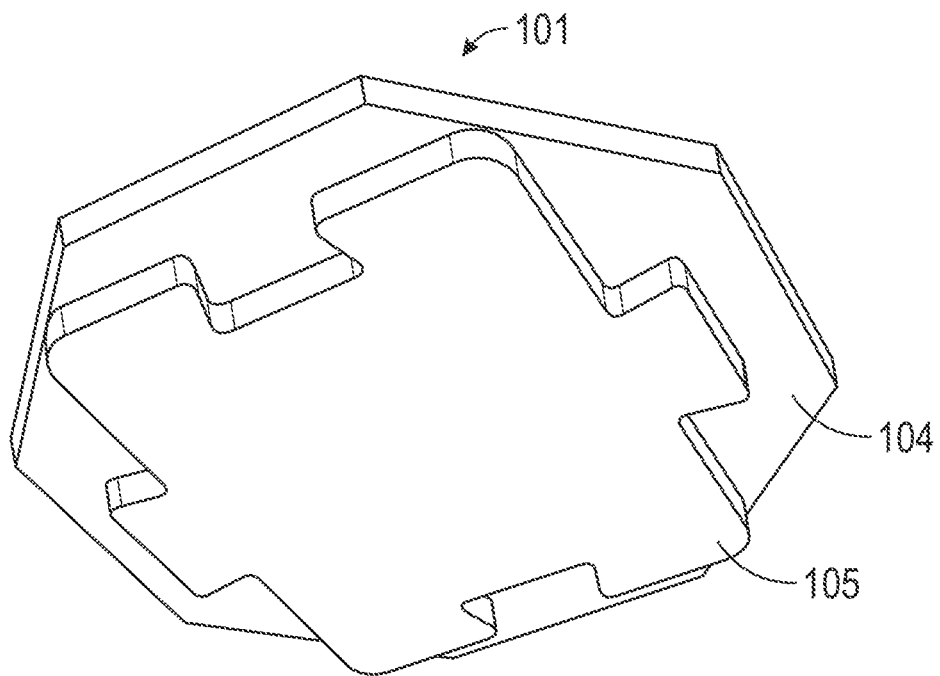
FIG. 5
FIG. 6
FIG. 7

US 10,920,377 B2

VERTICAL TAKEOFF AND LANDING PAD AND INTERLOCKING PAVERS TO CONSTRUCT SAME

RELATED APPLICATIONS

This application claims the benefit under 35 U.S.C. § 119(e) of U.S. Provisional Patent Application Ser. No. 62/654,833 titled VERTICAL TAKEOFF AND LANDING PAD AND INTERLOCKING PAVERS TO CONSTRUCT SAME filed on Apr. 9, 2018, the entire content(s) of which is/are incorporated herein by reference

GOVERNMENT INTEREST

The invention described herein was made in the performance of work under a NASA contract NNK11EA08C and by employees of the United States Government and is subject to the provisions of Public Law 96-517 (35 U.S.C. § 202) and may be manufactured and used by or for the Government for governmental purposes without the payment of any royalties thereon or therefore.

FIELD OF THE INVENTION

The present invention relates to vertical takeoff and landing pads and to interlocking paver systems and methods used to construct vertical takeoff and landing pads.

BACKGROUND OF THE INVENTION

There is a concern about the possibility of erosion of regolith below a lander on the Moon, Mars, or other extraterrestrial surface. One technique to mitigate this risk of erosion is to robotically build a landing pad that would withstand the exhaust plume from the landing vehicle. However, current paver technology does not have the features necessary to withstand the loads introduced to the landing pad during vehicle landing or take off. Use of existing paver technology would result in pavers either lifting and being thrown by the plume of the vehicle or allowing the exhaust from the vehicle to enter spaces between paver seams and erode the regolith underneath the landing pad constructed from the pavers. Therefore, there exists a need for a paver that could be used to construct a landing pad that would stay in place and prevent erosion of the underlying regolith.

SUMMARY OF THE INVENTION

With the above in mind, embodiments of the present invention are related to an interlocking paver system including a polygon paver and a spacer paver. The polygon paver may have a longitudinal axis extending from a first side to a second side of the polygon paver and a transverse axis orthogonal to the longitudinal axis and extending from a third side to a fourth side of the polygon paver. The spacer paver may have a longitudinal axis extending from a first side to a second side of the spacer paver and a transverse axis orthogonal to the longitudinal axis and extending from a third side to a fourth side of the spacer paver. Both the polygon and spacer pavers may be symmetrical about the longitudinal axis and the transverse axes. The spacer paver may be configured to selectively interlock with the polygon paver with either of the third or fourth side of the polygon paver adjacent either of the first or second side of the spacer paver and either of the first or second side of the polygon paver adjacent either of the third or fourth side of the spacer paver.

Either or both of the polygon and spacer pavers may be monolithic and/or formed from regolith. Either or both of the polygon paver and the spacer paver may be formed by heating regolith above an ambient temperature.

The polygon paver may include a top level and a bottom level. The top level may have a perimeter. The bottom level may have a perimeter and may be secured to and centered with respect to the top level. The perimeter of the top level may extend outwardly of the entirety of the perimeter of the bottom level. The perimeter of the top level of the polygon paver may be an octagon.

The perimeter of the bottom level of the polygon paver may be a rectangle having a first recessed notch centered on the third side of the polygon paver, a second recessed notch centered on the fourth side of the polygon paver, a first protrusion centered on the first side of the polygon paver, and a second protrusion centered on the second side of the polygon paver.

The spacer paver may include a top level and a bottom level. The top level may have a perimeter. The bottom level may have a perimeter and be secured to and centered on the top level. The perimeter of the bottom level may extend outwardly of the entirety of the perimeter of the top level.

The top level of the spacer paver may include an elongate center portion, a first isosceles trapezoid extension portion, and a second isosceles trapezoid extension portion. The elongate center portion may have a first and opposing second end parallel to the first and second sides of the spacer paver. The first isosceles trapezoid extension portion may be adjacent the first end of the elongate center portion. The second isosceles trapezoid extension portion may be adjacent the second end of the elongate center portion.

The perimeter of the bottom level of the spacer paver may be a rectangle having a first recessed notch centered on the third side of the spacer paver, a second recessed notch centered on the fourth side of the spacer paver, a first protrusion centered on the first side of the spacer paver, and a second protrusion centered on the second side of the spacer paver.

Each recessed notch of the polygon paver may be configured to receive either of the protrusions of the spacer paver. Each recessed notch of the spacer paver may be configured to receive either of the protrusions of the polygon paver.

The interlocking paver system may include at least four polygon pavers. The first side of the first polygon paver may be configured to interlock with the third side of the spacer paver. The second side of the second polygon paver may be configured to interlock with the fourth side of the spacer paver. The third side of the third polygon paver may be configured to interlock with the first side of the spacer paver. The fourth side of the fourth polygon paver may be configured to interlock with the second side of the spacer paver.

A launch pad may include a plurality of polygon pavers and spacer pavers. The first and second sides of each of the plurality of polygon pavers may be configured to interlock with the third and fourth sides of each of the plurality of spacer pavers. The third and fourth sides of each of the plurality of polygon pavers may be configured to interlock with the first and second sides of each of the plurality of spacer pavers.

BRIEF DESCRIPTION OF THE DRAWINGS

FIG. 5 is a bottom plan view of the spacer paver of FIG. 4.

FIG. 6 is a top plan view of the spacer paver of FIG. 4.

FIG. 7 is a bottom perspective view of a polygon paver of the vertical takeoff and landing pad of FIG. 1.

DETAILED DESCRIPTION OF THE INVENTION

Figure 1:
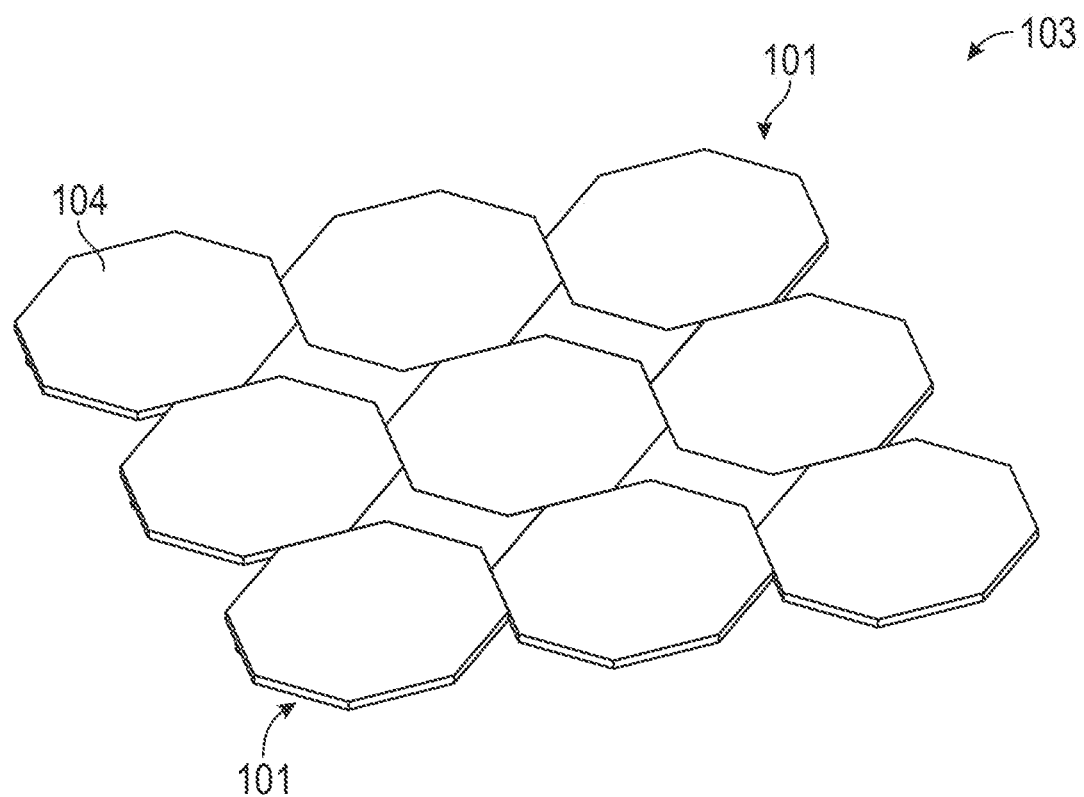
FIG. 1 is a top perspective view of a vertical takeoff and landing pad constructed from polygon and spacer pavers according to an embodiment of the invention.
Figure 2:
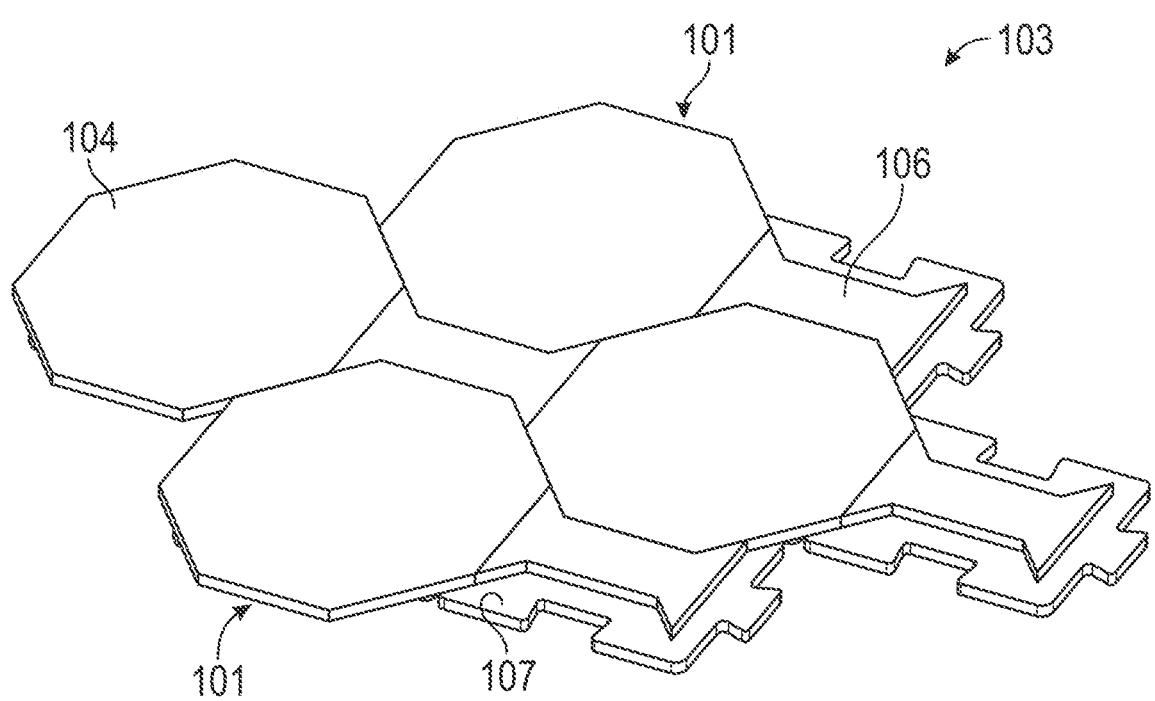
FIG. 2 is top perspective view of the vertical takeoff and landing pad of FIG. 1 in a partially constructed configuration.
Figure 3:
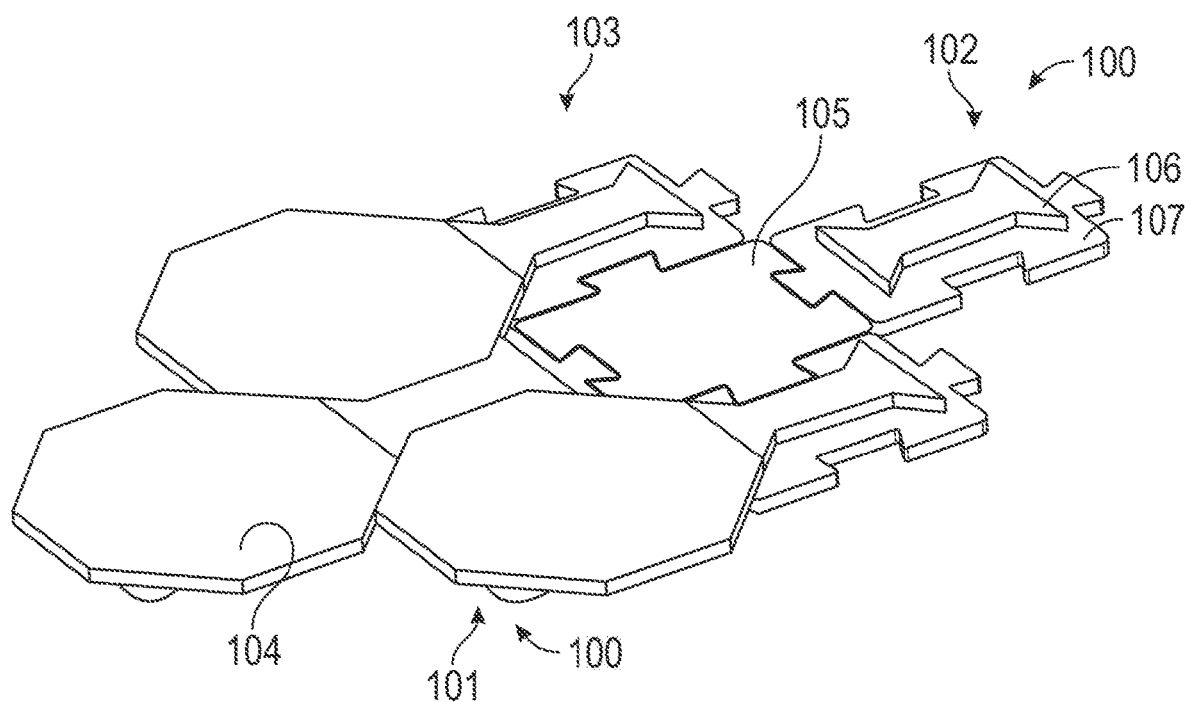
FIG. 3 is a top perspective view of the partially constructed vertical takeoff and landing pad of FIG. 2 with a top layer of one polygon paver removed.
Figure 4:
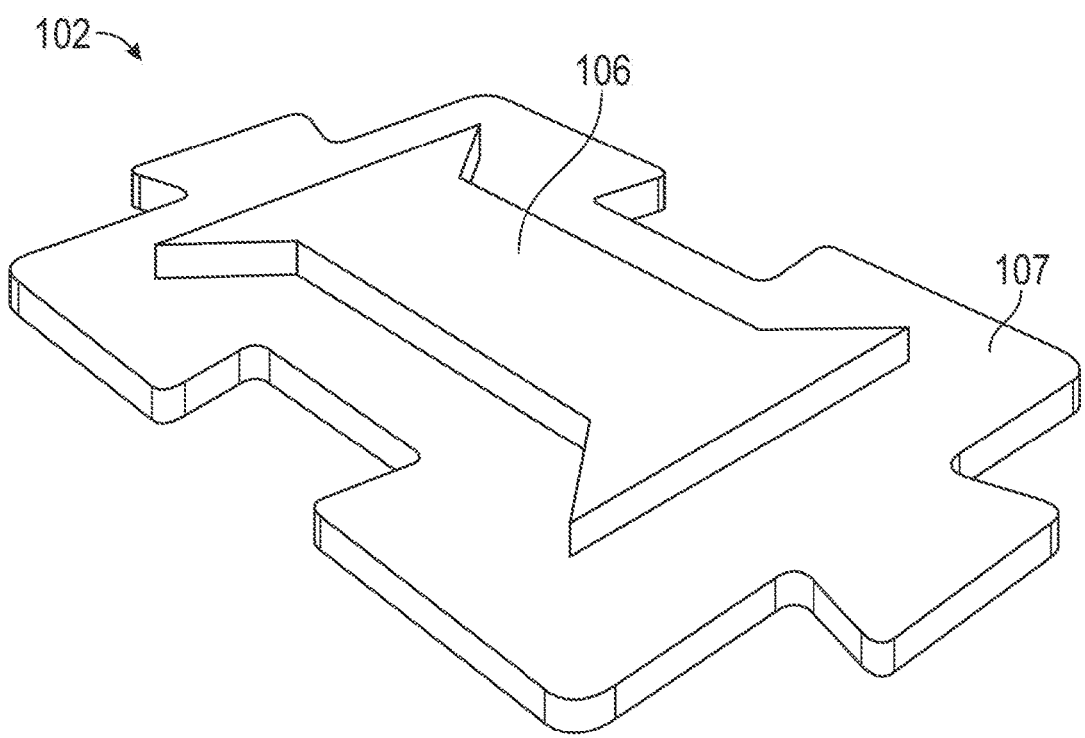
FIG. 4 is a top perspective view of a spacer paver of the vertical takeoff and landing pad of FIG. 1.
Figure 8:
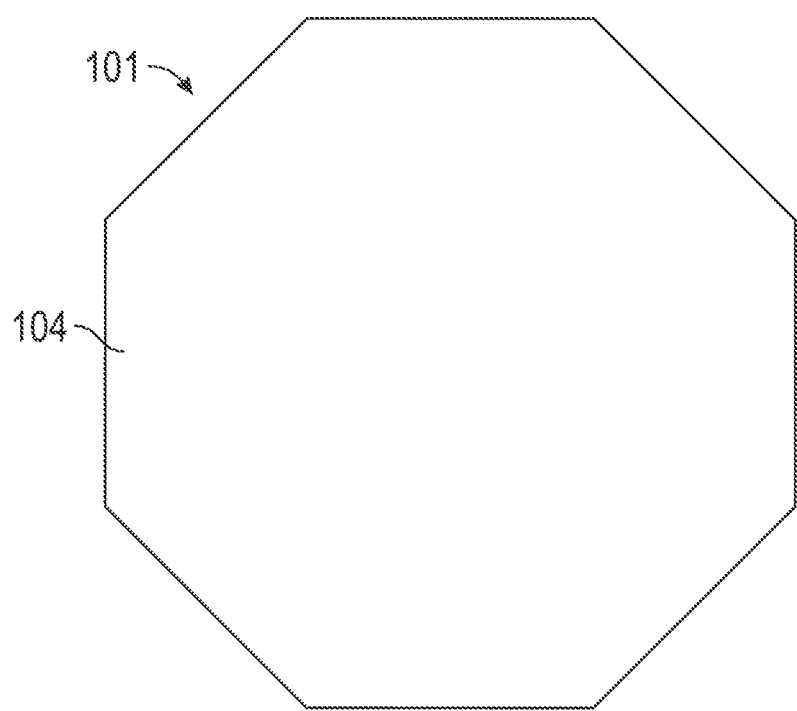
FIG. 8 is top plan view of the polygon paver of FIG. 7.
Figure 9:
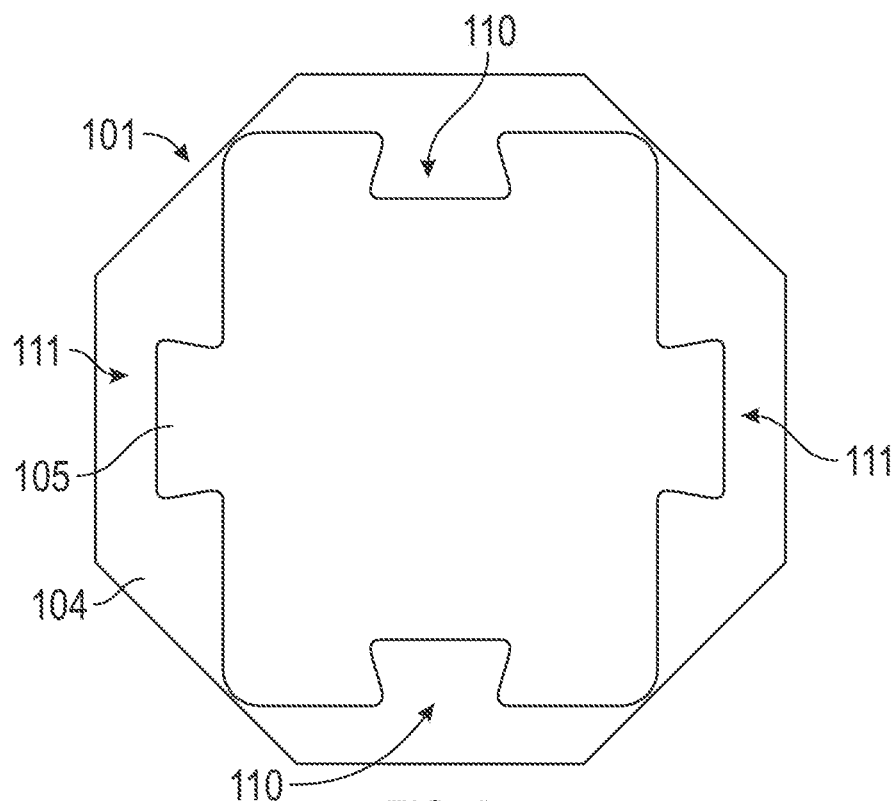
FIG. 9 is a bottom plan view of the polygon paver of FIG. 7.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a vertical takeoff and landing pad 103 and an interlocking polygon pavers 101 and spacer pavers 102, which may be used to build the vertical takeoff and landing pad 103 over regolith. The interlocking paver vertical takeoff and landing pad 103 design may include a molded solid material with tapered interlocking features interfacing with features of an opposite gender in three orthogonal directions. The interlocking polygon paver 101 and spacer paver 102 design may establish a toleranced connection between the pavers 101, 102 locking down 6 degrees of freedom.

The interlocking features of the polygon paver 101 and spacer paver 102 design may secure the placement of the pavers 101, 102 of the vertical takeoff and landing pad 103. Additionally, the pavers 101, 102 may have staggered assembly features that disrupt the flow of gas through the seams between pavers 101, 102.

In one embodiment, the pavers 101, 102 may be constructed from basalt. The pavers 101, 102 may be installed by an autonomous paver laying machine. The pavers 101, 102 may be constructed from in situ material available on a land mass in outer space prior to arrival of additional supplies, including, but not limited to, regolith.

In one embodiment, the paver 100 system may include two types of pavers 101, 102. The first paver type may be referred to as a polygon paver 101 and the second paver type may be referred to as a spacer paver 102. Both the polygon paver 101 and the spacer paver 102 may be of a monolithic construction and have a top level and a bottom level with distinct perimeter outlines. The polygon paver 101 may have a top level 104 and a bottom level 105. The spacer paver 102 may have a top level 106 and a bottom level 107.

Both the polygon paver 101 and spacer paver 102 may be symmetrical about both a longitudinal and a transverse axis. The bottom level 105 of the polygon paver 101 may interlock with the bottom level 107 of the spacer paver 102 and lay in the same plane as the bottom level 107 of the spacer paver 102. The top level 104 of the polygon paver 101 may interlock with the top level 106 of the spacer paver 102 and lay in the same plane as the top level 106 of the spacer paver 102. The perimeter of the top level 104 of the polygon paver 101 may extend past an entirety of the perimeter of the bottom level 105 of the polygon paver 101. The perimeter of the bottom level 106 of the spacer paver 102 may extend past an entirety of the perimeter of the top level 107 of the spacer paver 102. The top level 104 of the polygon paver 101 may rest on a portion of the bottom level 107 of the spacer paver 102 when the pavers 100 are arranged into a vertical takeoff and landing pad 103 configuration as depicted at least in FIG. 1.

The top level 104 of the polygon paver 101 may have a perimeter in the shape of an equilateral octagon. Every other side of the top level 104 of the polygon paver 101 may be positioned adjacent to and offset from a side of the top level 104 of another polygon paver 101 when the pavers 100 are configured as a vertical takeoff and landing pad 103. The top level 106 of the spacer paver 102 may be entirely surrounded by four polygon pavers 101 when the pavers 100 are configured as a vertical takeoff and landing pad 103. The perimeter of the top level 106 of the spacer paver 102 may include an elongate center portion 108 with a length equal to the length of one side of the equilateral octagon of the top level 104 of the polygon paver 101. An isosceles trapezoid extension 109 having a base length equal to the length of one side of the equilateral octagon of the top level 104 of the polygon paver 101 positioned at either end of the elongate center portion with the base of the trapezoid positioned away from the elongate portion.

The bottom level 105 of the polygon paver 101 may have an essentially rectangular perimeter with notches 110 formed in two opposing sides and protrusions 111 extending from the remaining two opposing sides. The bottom level 107 of the spacer paver 102 may have an essentially rectangular perimeter with protrusions 113 extending from two opposing sides and notches 112 formed in the remaining two opposing sides. The notches 110 of the polygon paver 101 may be adapted to receive the protrusions 113 of the spacer paver 102 and the notches 112 of the spacer paver 102 may be adapted to receive the protrusions 111 of the polygon paver 101.

The polygon paver 101 and spacer paver 102 may be cooperatively configured to allow the pavers 100 to be placed and secured in a checkerboard fashion alternating between polygon paver 101 and spacer paver 102. The respective notches 110, 112 and protrusions 111, 113 of the bottom level 105 of the polygon paver 101 and the bottom level 107 of the spacer paver 102 will receive one another when positioned in this checkerboard fashion.

The pavers 101, 102 may be formed by heating regolith in a ceramic form to 2100° F. and maintaining that temperature for up to 30 hours. When cooled, the regolith may be removed from the ceramic form and used to construct a vertical takeoff and landing pad 103.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the description of the invention. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

This background information is provided to reveal information believed by the applicant to be of possible relevance to the present invention. No admission is necessarily intended, nor should be construed, that any of the preceding information constitutes prior art against the present invention.

That which is claimed is:

1. A launch pad comprising:
    a plurality of polygon pavers each having a longitudinal axis extending from a first side to a second side and a transverse axis orthogonal to the longitudinal axis and extending from a third side to a fourth side, wherein each of the polygon pavers comprises:
        a top level having an octagonal perimeter, and
        a bottom level secured to and centered on the top level, wherein the bottom level has a rectangular perimeter with a first recessed notch centered on third side of the polygon paver, a second recessed notch centered on the fourth side of the polygon paver, a first protrusion centered on the first side of the polygon paver, and a second protrusion centered on the second side of the polygon paver, and
        wherein the perimeter of the top level extends outwardly of the entirety of the perimeter of the bottom level;
    a plurality of spacer pavers each having a longitudinal axis extending from a first side to a second side and a transverse axis orthogonal to the longitudinal axis and extending from a third side to a fourth side, wherein each of the spacer pavers comprises:
        a top level having a perimeter and comprising:
            an elongate center portion having a first and second end parallel to the first and second sides of the spacer paver,
            a first isosceles trapezoid extension portion adjacent the first end of the elongate center portion, and
            a second isosceles trapezoid extension portion adjacent the second end of the elongate center portion; and
        a bottom level secured to and centered on the top level and having rectangular perimeter with a first recessed notch centered on the third side of the spacer paver, a second recessed notch centered on the fourth side of the spacer paver, a first protrusion centered on the first side of the spacer paver, and a second protrusion centered on the second side of the spacer paver, and wherein the perimeter of the bottom level extends outwardly of the entirety of the perimeter of the top level;

wherein each of the plurality of polygon pavers is symmetrical about the longitudinal axis and the transverse axis;

wherein each of the plurality of spacer pavers is symmetrical about the longitudinal axis and the transverse axis; and wherein the first and second sides of each of the plurality of polygon pavers is configured to interlock with the third and fourth sides of each of the plurality of spacer pavers; and wherein the third and fourth sides of each of the plurality of polygon pavers is configured to interlock with the first and second sides of each of the plurality of spacer pavers.

\* \* \* \* \*